Figure 1:
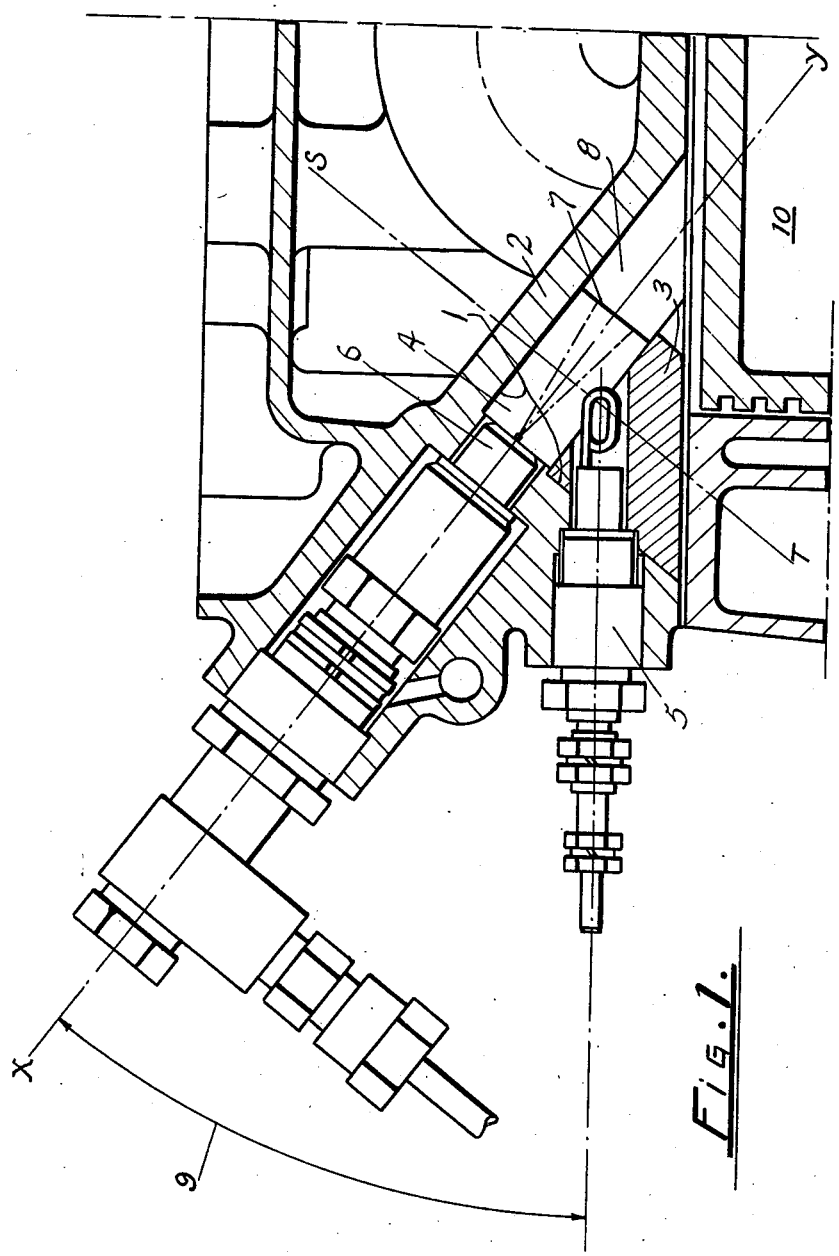

Oct. 29, 1957

L. E. BARBISAN 2,811,147

CYLINDRICAL COMBUSTION CHAMBERS FOR
DIESEL ENGINES OF ALL TYPES

Filed Jan. 20, 1955

2 Sheets-Sheet 1

INVENTOR
LUCIANO, ETTORE BARBISAN
BY

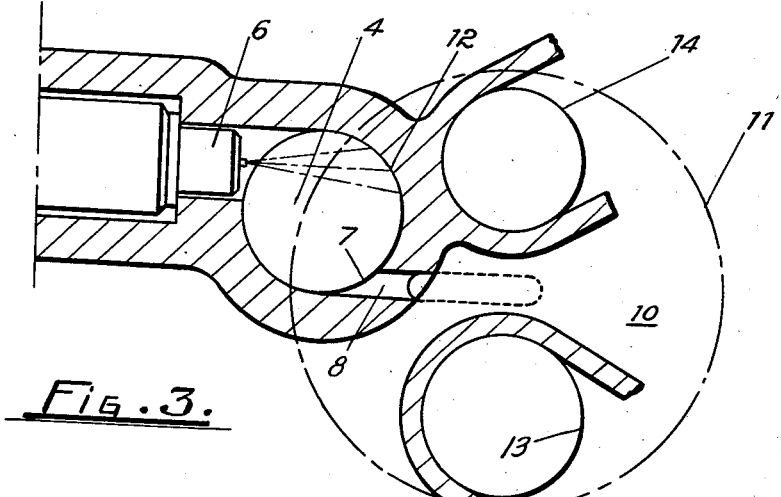
Fig. 3.
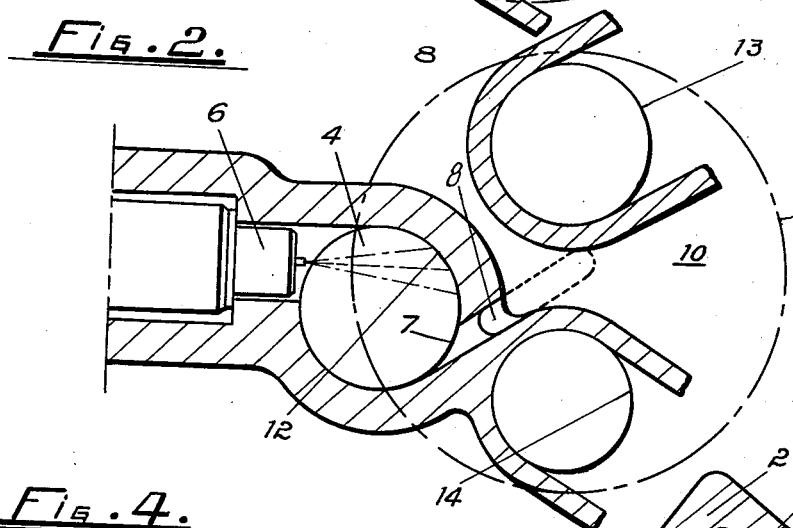
Fig. 2.
Fig. 4.
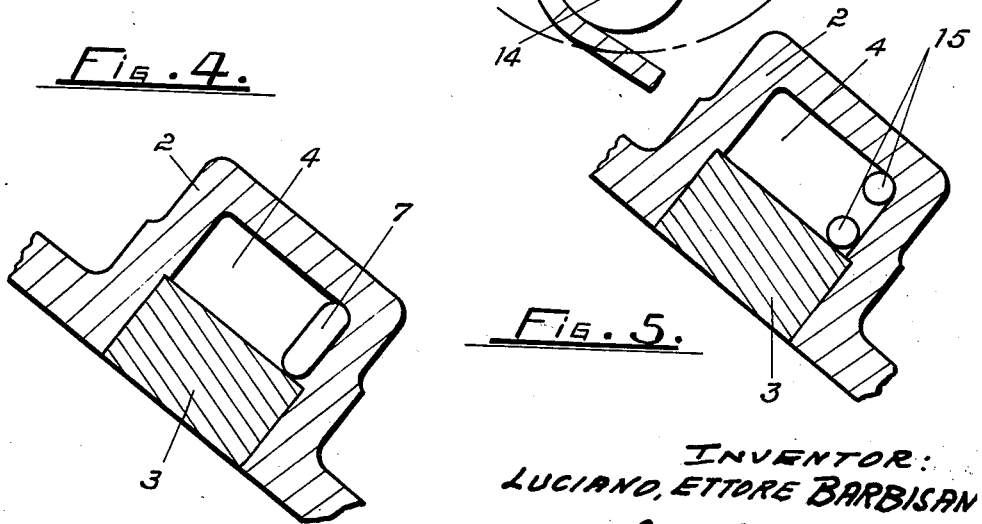
Fig. 5.

United States Patent Office 2,811,147
Patented Oct. 29, 1957

2,811,147

CYLINDRICAL COMBUSTION CHAMBERS FOR DIESEL ENGINES OF ALL TYPES

Luciano Ettore Barbisan, Paris, France

Application January 20, 1955, Serial No. 483,149

Claims priority, application France January 22, 1954

7 Claims. (Cl. 123—32)

The present invention relates to a cylindrical combustion chamber allowing total combustion of the fuel in motors of the internal combustion type with injection of liquid fuel and compression ignition, said chamber being inclined and machined in the cylinder head of the said motors.

Up to the present, motors of this type, generally, had a combustion chamber substantially spherical in shape communicating with the motor cylinder by a flow channel tangential to the sphere. This channel could only have a limited cross-section in order to give to the air driven back by the motor piston the rotating movement necessary for producing a whirling movement; an increase in this cross-section tangentially to the sphere would result in a braking effect on the said rotating movement in as much as the small air streams directed through the passage would emerge into the spherical chamber in opposing directions. The spherical combustion chamber is therefore only swept by the air over an area limited by the cross-section of the flow channel. The unswept areas of the spherical combustion chamber represent a large portion of the volume of the sphere and the air which spreads over these areas has no whirling movement and therefore no turbulence and consequently a large percentage of air is unused during the combustion.

The present invention, which overcomes these disadvantages and improves the combustion of the fuel in motors of the internal combustion type with liquid fuel injection and compression ignition, essentially relates to an inclined combustion chamber machined in the cylinder head of the motor and in which the passageway communicating with the motor cylinder emerges tangentially over the whole of its height, thus allowing the air driven back by the motor cylinder piston to sweep completely the inside surface of the combustion chamber cylinder with the result that the whole of this air receives an effective rotating movement which allows the injected fuel to be completely consumed.

Other features and advantages of the present invention will become apparent from the following description with reference to the accompanying drawings which represent diagrammatically and by way of non-limitative examples, several embodiments of the combustion chamber according to the invention.

Fig. 1 is a view in elevation, partly in section, of a cylinder head comprising a combustion chamber according to the present invention. Figs. 2 and 3 are sections taken along the centre line XY of the injector showing two embodiments of the combustion chamber according to the invention. Figs. 4 and 5 are sectional views taken along the axis of the cylinder constituting the combustion chamber according to the invention and showing two embodiments of the communication passage.

In Fig. 1, a cylindrical recess 1 is provided in a cylinder head 2. A solid plug 3 is fitted in the cylinder head 2 along the axis ST of the cylindrical recess 1 to a given depth, so as to form a combustion chamber 4 of cylindrical shape. A passage is provided in this plug 3 for an electrical ignition device 5. The recess communicates, on the one hand, with an injector 6, and, on the other hand, with a communication passageway 8 in the form of a slot 7 tangential to the combustion chamber 4. The axis XY of the injector 6 makes a definite angle 9 with the direction of the plane perpendicular to the axis of the engine cylinder 10, and said angle may vary according to practical conditions of construction.

In Figure 2, the injector 6 is located in such a manner that the extension of its axis intersects the axis of the cylinder 10 of the engine. The wall of the engine cylinder 10 is diagrammatically illustrated in the form of a circumference 11. The hot point 12 of the combustion chamber 4 struck by the fuel injected along the axis of the injector 6 is surrounded by the motor cooling water jacket.

The communicating passage 8 is tangential to the cylinder constituting the combustion chamber 4.

This communicating passage 8 is directed in such a manner that its axis intersects the axis of the engine cylinder 10 or passes very near this axis; 13 designates the intake pipe and 14 the exhaust pipe.

In Fig. 3, the communicating passageway 8 tangential to the cylindrical combustion chamber 4, is located in such a way that its axis intersects the axis of the engine cylinder 10. In this embodiment, it will be seen that, in contradistinction to the embodiment of Figure 2, the axis of the injector does not intersect the axis of the cylinder. In such a combustion chamber, the hot point 12 struck by the liquid injected along the axis of the injector 6 is adjacent the exhaust pipe 14.

In Fig. 4, the opening through which the communicating passage tangential to the combustion chamber 4 issues into said chamber, is constituted by a slot 7 having the same height as said chamber, and a width which is determined by the ideal cross-section needed for the passage of the air or the burnt gases.

In Fig. 5 slot 7 is replaced by at least two holes 15 of such a size that their total cross-sections correspond to the ideal cross-section for the passage of the air or of the burnt gases.

I claim:

1. An internal combustion engine, with liquid fuel injection and compression ignition, having a cylinder and a fuel injector within the cylinder head, comprising a cylindrical combustion chamber machined in the cylinder head, the axis of said combustion chamber being inclined at a predetermined angle with respect to the plane perpendicular to the axis of the engine cylinder, said angle being greater than 45°, and a communicating passage located between said combustion chamber and said engine cylinder and adapted to conduct air from said cylinder into said combustion chamber in a stream tangential to the inner surface of the wall of the chamber, said cylindrical combustion chamber being bounded by a solid plug fitted in the cylinder head co-axially with the axis of said combustion chamber, said fuel injector being located for injection of a fuel jet into said combustion chamber tangentially to the flow of said stream of air within said combustion chamber.

2. An internal combustion engine according to claim 1, in which the communicating passage issues into the combustion chamber over the whole of the height of said combustion chamber.

3. An internal combustion engine according to claim 1, in which the injected fuel strikes the combustion chamber at a hot point surrounded by the cooling water of the engine.

4. An internal combustion engine according to claim 1, in which the injected fuel strikes the combustion chamber at a hot point adjacent to the exhaust pipe of the engine.

5. An internal combustion engine according to claim 1, in which the communicating passage, as it issues into the combustion chamber, has the form of a slot.

6. An internal combustion engine according to claim 1, in which the communicating passage, as it issues into the combustion chamber, has the form of at least two holes.

7. In an internal combustion engine provided with a piston and cylinder and operated by liquid fuel injector means and ignition means; at least one cylindrical combustion chamber defined by walls in the head of said cylinder, the axis of said combustion chamber being inclined with respect to a plane extending perpendicular to the axis of said cylinder and forming an angle greater than 45°, and a passageway located in a predetermined wall of said combustion chamber and establishing communication between said combustion chamber and said cylinder, said passageway being shaped to conduct a stream of air from said cylinder into said combustion chamber tangentially to said wall of the latter, whereby said stream of air will be guided without turbulence against the inner wall surface of said combustion chamber and therealong, said fuel injector means being located for injection of a fuel jet into said combustion chamber tangentially to said stream of air within said combustion chamber.

References Cited in the file of this patent

UNITED STATES PATENTS

| 2,058,827 | Ricardo | Oct. 27, 1936 |

FOREIGN PATENTS

| 113,132 | Sweden | Feb. 6, 1945 |
| 744,782 | Germany | July 29, 1944 |
| 806,071 | Germany | June 11, 1951 |